E. O. SOUCY.
POULTRY DRINKING FOUNTAIN.
APPLICATION FILED NOV. 2, 1915.
1,269,874.
Patented June 18, 1918.
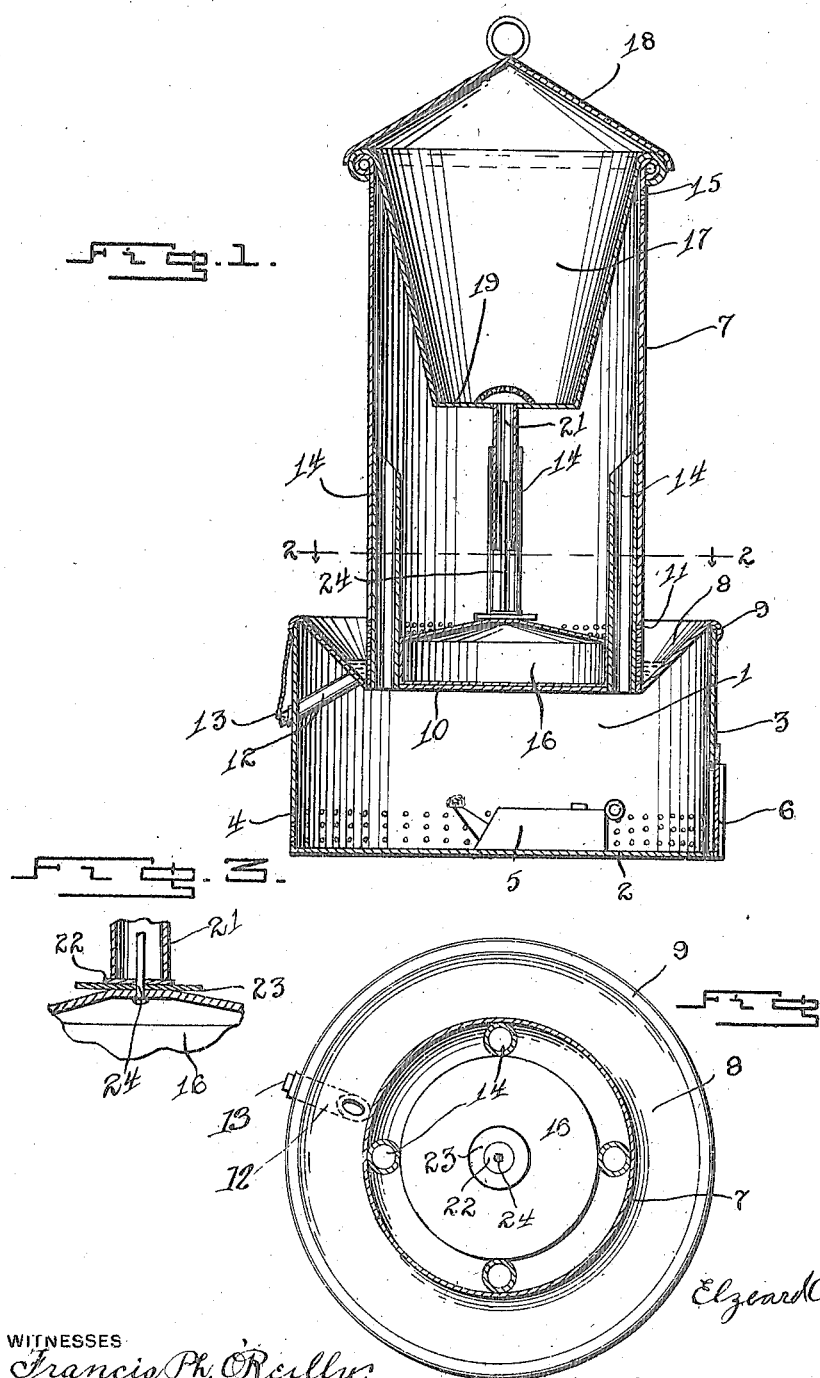
INVENTOR
Elzéard O. Soucy,
WITNESSES
Francis Ph. O'Reilly.
BY
ATTORNEY

UNITED STATES PATENT OFFICE.

ELZEARD O. SOUCY, OF RUSH CITY, MINNESOTA, ASSIGNOR OF ONE-HALF TO MATHIAS LALOND, OF RUSH CITY, MINNESOTA.

POULTRY DRINKING-FOUNTAIN.

1,269,874.   Specification of Letters Patent.   Patented June 18, 1918.

Application filed November 2, 1915. Serial No. 59,273.

*To all whom it may concern:*

Be it known that I, ELZEARD O. SOUCY, a citizen of the United States, residing at Rush City, in the county of Chisago and State of Minnesota, have invented certain new and useful Improvements in Poultry Drinking-Fountains, of which the following is a specification.

My invention relates to a watering trough for poultry and the like and more particularly to a poultry drinking fountain having means for heating the liquid contained therein to prevent freezing and means for controlling the supply of liquid.

The primary object of my invention is to provide an animal or poultry drinking fountain of the class described being simple in construction, strong and durable, effective in operation and cheap to manufacture.

Another object of my invention is to provide a main liquid containing tank, heating means associated therewith, and means for controlling the out-put of said tank, whereby to supply the liquid to a trough as the latter is emptied.

With the above and other objects in view my invention resides preferably in the construction, combination and arrangement of parts as hereinafter set forth in the specification and illustrated in the accompanying drawings, in which, Figure 1 is a vertical sectional view of a poultry fountain embodying the improvements of my invention.

Fig. 2 is a transverse sectional view taken on the line 2—2 of Fig. 1, looking in the direction of the arrow, and Fig. 3 is a detail enlarged sectional view of the liquid supply controlling means in closed position.

Similar reference characters designate similar parts throughout the various views of the drawings.

In the drawings, I have illustrated my improved poultry and animal drinking fountain which comprises a base substantially cylindrical in configuration to provide a heating chamber 1, having a bottom 2 and a side wall 3. The side wall 3 is perforated, as indicated at 4, to permit ingress of air. A suitable heating means such as a lamp 5 may be placed in the chamber 1. I provide a door 6 in the wall of the heating chamber to permit the withdrawal of the lamp.

I provide a liquid containing means, and controlling means for said liquid which is mounted above the heating chamber 1. This structure embodies a vertical cylindrical body 7 forming a float chamber, having the lower marginal edge thereof below the upper marginal edge of the wall 3 of the heating chamber, a suitable inclined or flaring annulus 8 having engagement with the top of the wall 3, as indicated at 9, being arranged to support said float chamber. The bottom 10 of said float chamber is disposed above the lamp, and the wall of the float chamber is perforated, as indicated at 11, to permit egress of the liquid contents into the trough provided by the annulus 8 for the use of fowls or the like. A suitable drain pipe 12 is provided for the trough, being normally closed by a plug 13.

The bottom 10 is provided with a plurality of openings arranged adjacent the wall 7 of the float chamber, in which openings are mounted heat vents comprising tubes 14 lying parallel with and proximate to the wall of the float chamber 7 to a distance about midway the height of said wall. The wall of the chamber 7 is provided with a plurality of heat outlet openings 15 adjacent the upper end thereof.

The tubes 14 not only provide conducting means for the heat but also form guides for a float 16 adapted for vertical movement in the float chamber 7. The float 16 serves as means for automatically closing off the supply of liquid when said liquid reaches a predetermined height. I provide a liquid receiving tank 17 over which a suitable closure 18 is arranged. The tank 17 preferably tapers throughout its depth and is provided in the bottom 19 thereof with a central aperture communicating with an outlet tube 21, the lower extremity of which is open. Suitable closing means for the lower extremity of the tube 21 is provided, said means comprising a closing washer 22 of rubber or the like mounted centrally of the float 16, said washer having a base plate 23 mounted therebeneath. The washer 22 and base plate 23 are retained on the float 16 by means of a guide rod 24 riveted or soldered to said float, said guide rod extending upwardly into the tube 21 to center the float when moving into the closed position, as shown to advantage in Fig. 3.

In operation, liquid is placed in the tank 17 and will flow downwardly through the tube 21, passing through said tube to the float chamber 7 causing said float to rise. When the water has reached a predetermined height, the float will bring the washer 22 into engagement with the lower end of the tube 21, effectively closing off the supply of liquid. As the liquid in the float chamber is exhausted it will be replenished from the tank by the float automatically lowering, thereby opening the tube 21. The course of warm air from the lamp will be upwardly through the tubes 14 into the float chamber 7, about the tank 17, and thence outwardly through the perforations 15, warming the contents of the tank and float chamber. While the invention has been shown as cylindrical in configuration it will be readily understood by those skilled in the art that this shape may be changed at will. Attention is also directed to the fact that the device is absolutely fire-proof and requires no attention until completely empty when the tank 17 must be refilled.

From the above description taken in connection with the accompanying drawings it is thought that a clear and comprehensive understanding of the construction, operation and advantages of my invention may be readily gathered, and while I have shown and described the same as embodying a specific structure I desire that it be understood that I may make such changes therein which do not depart from the spirit and scope of the invention as claimed.

I claim:—

1. A drinking fountain including a float chamber and a reservoir having an outlet into the float chamber, a lamp chamber supporting the float chamber, heat tubes in the float chamber communicating with the lamp chamber and having an outlet in the float chamber, and a float in the float chamber with a valve adapted to close the reservoir outlet, said heat tubes forming a guide for the float.

2. A drinking fountain including a float chamber and a superposed water reservoir having an outlet into the float chamber, a heating chamber supporting said float chamber, heat pipes carried by the float chamber and communicating with the float chamber and heating chamber, a float guided in its movements by the heat pipes, and a valve piece carried by the float for sealing the reservoir outlet when the water level reaches a predetermined height.

3. A drinking fountain including a heating chamber, a float chamber carried upon said heating chamber, a superposed water reservoir having an outlet into said float chamber, heat tubes in the float chamber communicating with said heating chamber and having an outlet in the float chamber in alinement with said water reservoir, whereby the heat passing from said heating chamber through said tubes will be directed into engagement with said water reservoir, and a float in the float chamber with a valve adapted to close the reservoir outlet and said heat tubes forming a guide for the float.

4. A drinking fountain including a heating chamber, a float chamber carried upon said heating chamber and projecting thereabove, a superposed reservoir carried upon said float chamber, said reservoir converging toward its lower end so as to project downwardly into said float chamber for forming a space adjacent its side portion said float chamber having exhaust openings adjacent its top and contiguous to the upper portions of said reservoir, heat tubes in the float chamber communicating with said heating chamber and being in alinement with the sides of said reservoir for directing the heated air from said heating chamber against the sides of said reservoir, after which the air will be exhausted to exhaust openings in said heat chamber, and a float in the float chamber with a valve adapted to close the reservoir outlet, said heat tubes forming a guide for the float.

In testimony whereof I affix my signature in presence of two witnesses.

ELZEARD O. SOUCY.

Witnesses:
JOHN L. MURPHY,
MATT LALOND.

Copies of this patent may be obtained for five cents each, by addressing the "Commissioner of Patents, Washington, D. C."